United States Patent
Lin et al.

(10) Patent No.: US 7,663,828 B2
(45) Date of Patent: Feb. 16, 2010

(54) DETERMINING THE RELIABILITY OF A DISK DRIVE

(75) Inventors: Chris C. L. Lin, Rochester, MN (US);
Robert T. Longbottom, Singapore (SG);
Carla Q. Nunez, Laguna (PH);
Masatoshi Mizumachi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 278 days.

(21) Appl. No.: 11/585,456

(22) Filed: Oct. 23, 2006

(65) Prior Publication Data
US 2008/0094740 A1 Apr. 24, 2008

(51) Int. Cl.
*G11B 27/36* (2006.01)
(52) U.S. Cl. .................................... 360/31
(58) Field of Classification Search .............. 360/31, 360/75, 69; 711/170; 716/2, 5; 707/100; 370/231; 702/186
See application file for complete search history.

(56) References Cited

U.S. PATENT DOCUMENTS

| | | | | |
|---|---|---|---|---|
| 4,725,968 A | * | 2/1988 | Baldwin et al. | 702/186 |
| 7,310,720 B2 | * | 12/2007 | Cornett | 711/170 |
| 7,339,891 B2 | * | 3/2008 | Binder et al. | 370/231 |
| 7,418,681 B2 | * | 8/2008 | Takei | 716/5 |
| 2004/0181761 A1 | * | 9/2004 | Kidera | 716/2 |
| 2006/0069689 A1 | * | 3/2006 | Karklins et al. | 707/100 |

OTHER PUBLICATIONS

Baxter, Peter, "SPC Analysis Unraveled", *Distributed Software*, (Sep. 16, 2002), p. 1-17.

* cited by examiner

*Primary Examiner*—Fred Tzeng

(57) ABSTRACT

Embodiments of the present invention pertain to determining the reliability of a disk drive. According to one embodiment, values for a parameter associated with a particular type of component of the disk drive are detected while simulating customer usage of the disk drive. The values are stored to enable analyzing the values for statistical variations to determine the reliability of the disk drive.

17 Claims, 3 Drawing Sheets

DETERMINING THE RELIABILITY OF A DISK DRIVE

TECHNICAL FIELD

Embodiments of the present invention relate to disk drives. More specifically, embodiments of the present invention relate to determining the reliability of a disk drive.

BACKGROUND

Manufacturers of disk drives perform what is commonly known as ongoing reliability testing in order to assess the quality of their disk drives as well as to monitor and improve their manufacturing process. As a part of ongoing reliability testing, customer usage simulations are performed on a sample of disk drives that represents, for example, manufactured disk drives for a period of time, such as a week. Customer usage simulations can represent the way that the disk drives will be used by customers who will potentially buy the disk drives. In conventional ongoing reliability testing, disk drives that have hard failures are analyzed to determine the core reason for their failures. The results of the analysis are used to improve the manufacturing process in order to prevent those types of failures occurring in future disk drives.

Further, the results of the analysis can also be used to determine whether to a certain batch of disk drives are good enough to be sold to customers. For example, if the number of disk drives that fail the ongoing reliability test exceeds an acceptable threshold, a risk assessment is performed. For example, the risk assessment may involve determining whether the customer usage simulations represent the customers that the disk drives the sample was taken from will be sold to. For example, disk drives are typically rated for 1 million hours mean time to failure. If a customer typically uses their disk drives less than 1 million hours, then the risk of selling disk drives to that customer is less.

Customers who buy disk drives typically require that ongoing reliability testing be performed. Certain results, such as throughput and seek time, from the ongoing reliability testing are typically provided to the customers. For the foregoing reasons, it can be seen that ongoing reliability testing is of great importance.

SUMMARY OF THE INVENTION

Embodiments of the present invention pertain to determining the reliability of a disk drive. According to one embodiment, values for a parameter associated with a particular type of component of the disk drive are detected while simulating customer usage of the disk drive. The values are stored to enable analyzing the values for statistical variations to determine the reliability of the disk drive.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
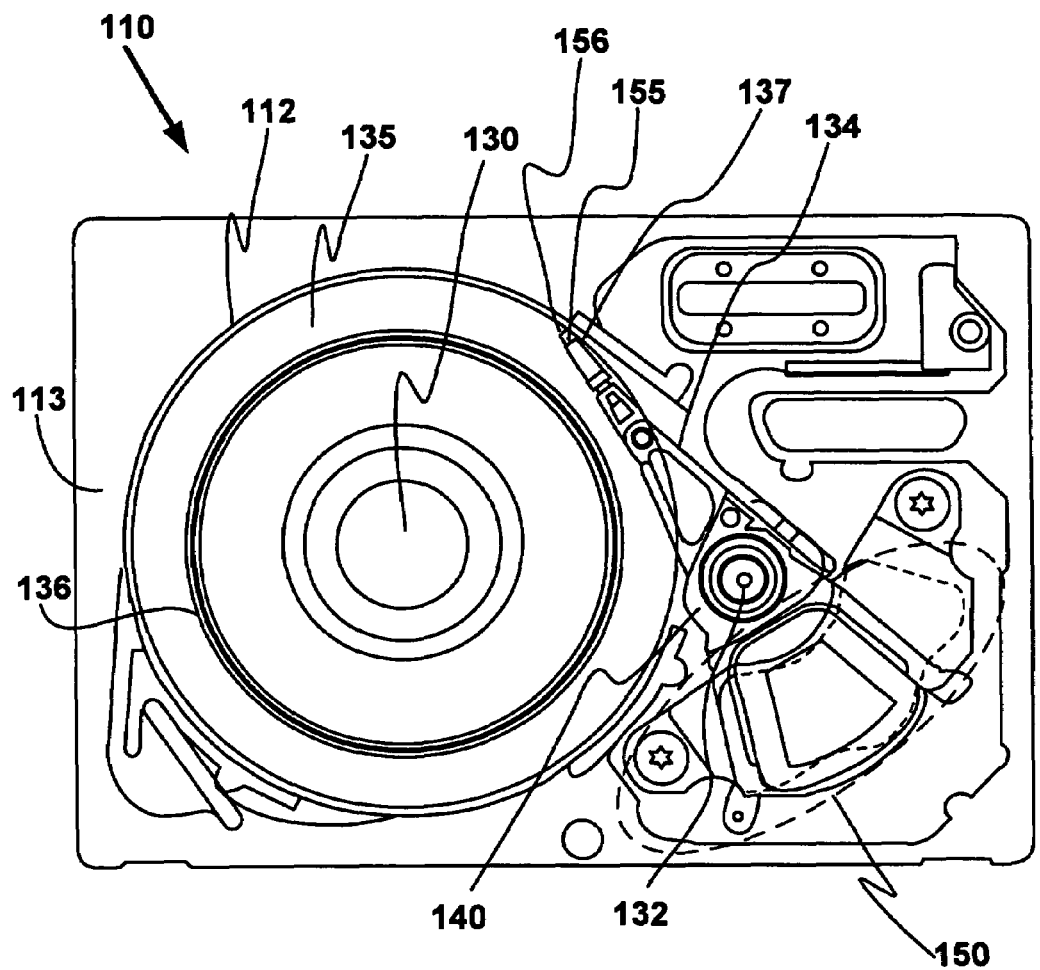
FIG. 1 depicts a plan view of a disk drive in order to facilitate discussion of determining the reliability of a disk drive using various embodiments of the present invention.

The drawings referred to in this description should not be understood as being drawn to scale except if specifically noted.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

Conventional ongoing reliability testing suffers from a number of problems. Only information from failed disk drives is used. There may be a lot of valuable information from disk drives that do not fail that ends up not being used. The disk drives that do not fail during conventional ongoing reliability testing may be close to failing. Further, even if they aren't close to failing, information about them may still be of use in improving the manufacturing process.

Therefore, according to one embodiment, values for a parameter associated with a particular type of component, such as the head, the disk, the motor or the disk drive's card, are detected for a disk drive while simulating customer usage of the disk drive. The detected values are stored to enable analysis of the values for statistical variations to determine the reliability of the disk drive. The values for types of components are also known as parametric values. Examples of parameters include over write, asymmetric, amplitude, resistance, write errors, soft error rate (SER), etc. . . . Values for the various parameters can be detected and stored using various embodiments of the present invention.

According to one embodiment, the parametric values gathered for different samples of disk drives that represent different periods of the manufacturing process can be analyzed. For example, the parametric values for a first sample of disk drives may be analyzed for one week of disk drives that are manufactured. Then the parametric values for a second sample of disk drives may be analyzed for the next week of disk drives and so on. The parametric values from the different samples can be compared to determine if there are statistical variations in the parametric values. In another example, the parametric values for a sample of disk drives that represent, for example, a week of manufactured disk drives could be compared, for example, to the parametric values for a couple of months of sampled disk drives.

A Disk Drive

FIG. 1 depicts a plan view of a disk drive in order to facilitate discussion of determining the reliability of a disk drive using various embodiments of the present invention. The disk drive 110 includes a base casting 113, a motor hub assembly 130, a disk 112, actuator shaft 132, actuator arm 134, suspension assembly 137, a hub 140, voice coil motor 150, a magnetic read write head 156, and a slider 155. The magnetic read write head 156, among other things, includes a writer for writing data to a disk 112 and a reader for reading data from the disk 112.

The components are assembled into a base casting 113, which provides attachment and registration points for components and sub assemblies. A plurality of suspension assemblies 137 (one shown) can be attached to the actuator arms 134 (one shown) in the form of a comb. A plurality of transducer heads or sliders 155 (one shown) can be attached respectively to the suspension assemblies 137. Sliders 155 are located proximate to the disk 112's surface 135 for reading and writing data with magnetic heads 156 (one shown). The rotary voice coil motor 150 rotates actuator arms 135 about the actuator shaft 132 in order to move the suspension assemblies 150 to the desired radial position on a disk 112. The actuator shaft 132, hub 140, actuator arms 134, and voice coil motor 150 may be referred to collectively as a rotary actuator assembly.

Data is recorded onto the disk's surface 135 in a pattern of concentric rings known as data tracks 136. The disk's surface 135 is spun at high speed by means of a motor-hub assembly 130. Data tracks 136 are recorded onto spinning disk surfaces 135 by means of magnetic heads 156, which typically reside at the end of sliders 155.

FIG. 1 being a plan view shows only one head, slider and disk surface combination. One skilled in the art understands that what is described for one head-disk combination applies to multiple head-disk combinations, such as disk stacks (not shown). However, for purposes of brevity and clarity, FIG. 1 only shows on head and one disk surface.

Simulation

According to one embodiment, simulations are performed on the disk drives. For example, the simulations may be designed to represent the way that customer(s) use disk drives (also referred to herein as "customer usage simulation"). The simulation, according to one embodiment, is a stress test using duty cycles, voltage margins, high and low temperature extremes and varying humidity. The simulation can be used as a part of ongoing reliability testing, which is typically performed for 1 to 6 weeks. As will become more evident, the results from the simulation can be used to assess the reliability of disk drives and to improve manufacturing.

Types of Components

As already stated, according to one embodiment, values for a parameter associated with a particular type of component, such as the head, the disk, the motor and the disk drive card, are detected for a disk drive while simulating customer usage of the disk drive. FIG. 1 depicts the head 156, the disk 112 and the motor includes the VCM 150 as depicted in FIG. 1. The head 156, among other things, includes a writer for writing data to a disk and a reader for reading data from the disk.

Parameters

Values for parameters associated with particular types of components of a disk drive can be detected while customer usage simulations are performed on the disk drive. Examples of parameters include, but are not limited to, overwrite, asymmetry, amplitude, resistance, write errors, soft error rate (SER), recovered error count, grown defects count (also known as "reassign counts"), motor current, how long it takes to start the motor, repeatable and non-repeatable run out errors, write channel chip, servo ARC (automatic gain control), throughput and seek time.

Overwrite, according to one embodiment, represents the current required to reverse the data on a disk. Amplitude, according to one embodiment, indicates how much magnetic field the reader can detect from a disk. Motor current, according to one embodiment, represents how much current is required to spin the disk. Motor current can be a strong indicator of the reliability of the motor. However, motor current may also represent the reliability of the spindle. Throughput can represent the amount of data that can be transferred per second. Seek time can represent, among other things, how long it takes to re-position the actuator from one part of the disk to another part of the disk for the purposes of reading from or writing to the disk.

The values of parameters can be used to indicate the reliability of one or more components. For example, throughput and seek time can indicate the overall reliability of a disk drive. Overwrite can indicate the reliability of the writer and the disk. SER can indicate the reliability of the head and the disk. Servo ARC can indicate the reliability of the head and the disk. Asymmetry, amplitude, and resistance can indicate the reliability of a reader. Write errors can indicate the reliability of the head. Recovered error count and grown defects count can indicate the reliability of the disk. The motor current, how long it takes to start the motor, repeatable and non-repeatable run out errors can indicate the reliability of the motor.

Analyzing the Values

According to one embodiment, the values are analyzed for statistical variations to determine the reliability of the disk drives. For example, the values for a particular type of component for more than one sample of disk drives can be compared to each other to determine if there are any statistical variations between the samples of disk drives with respect to that particular type of component. In a more specific example, the overwrite values for the disk drive sample taken from disks manufactured between Jul. 1 and Jul. 7, 2006 can be compared to the overwrite values for the disk drive samples taken from disk drives manufactured between May 1 to Jun. 31, 2006. According to one embodiment, the analysis results can be used to build a predictive model of how disk drives behave. Further, according to another embodiment, the analysis of the values can be automated using for example an analysis tool implemented using software, hardware, firmware, or a combination thereof.

According to one embodiment, the values for component parameters are analyzed for statistical variations. For example, a determination can be made as to whether a statistical variation is due to an assignable cause or whether it is due to a false alarm. If the statistical variation is due to an assignable cause, it can be classified as either a positive cause or negative cause to the overall function of a disk drive.

The determination of causes, whether positive or negative, can be used as a part of continuously improving the manufacturing process. For example, a negative cause can be isolated and the manufacturing process can be modified to reduce or eliminate the negative cause. The determination of a positive cause can also be used as a part of improving the manufacturing process. For example, if a positive cause is found, steps can be taken to as much as possible ensure that the manufacturing process will continue to build disk drives with the characteristic(s) associated with the positive cause. Further, disk drives that represent the manufacturing process can be analyzed and the manufacturing process can be continuously improved using the results of the analysis, for example, using a feedback loop approach.

Statistical Process Control

According to one embodiment, statistical process control (SPC) is used to analyze values that are detected for the components' parameters. Further, SPC can be used as a part of continuously improving the manufacturing process using the results of the analysis as described herein.

Statistical process control, according to one embodiment, refers to an optimization technique that can be used for continuous improvements using, for example, a number of statistical techniques such as Shewhart charts, Paretto, cause and effect diagrams, histograms and regression analysis. According to various embodiments of the present invention, values for many different types of disk drive components can be collected, for example by detecting and storing the values, during simulation of the disk drives. These values can be monitored using one or more of the statistical techniques such as continuous (variable) or discrete (attribute). Refer to "SPC Analysis Unraved" by Peter Baxter published Sep. 16, 2002, the contents of which are incorporated herein, for more details on SPC.

Traditionally tools, such as histograms and spec charts, for visually depicting results using SPC assume statistically normal distributions therefore masking statistical variations. Therefore, according to one embodiment, results that exceed a specified threshold are visually highlighted.

According to one embodiment, western electric company's (WECO) rules are used as a part of analyzing the values for statistical variations to find statistically improbable patterns. The WECO rules, according to one embodiment, can be used as a part of determining whether a statistical variation is due to a problem or a false alarm.

A System for Determining the Reliability of a Disk Drive

Figure 2:
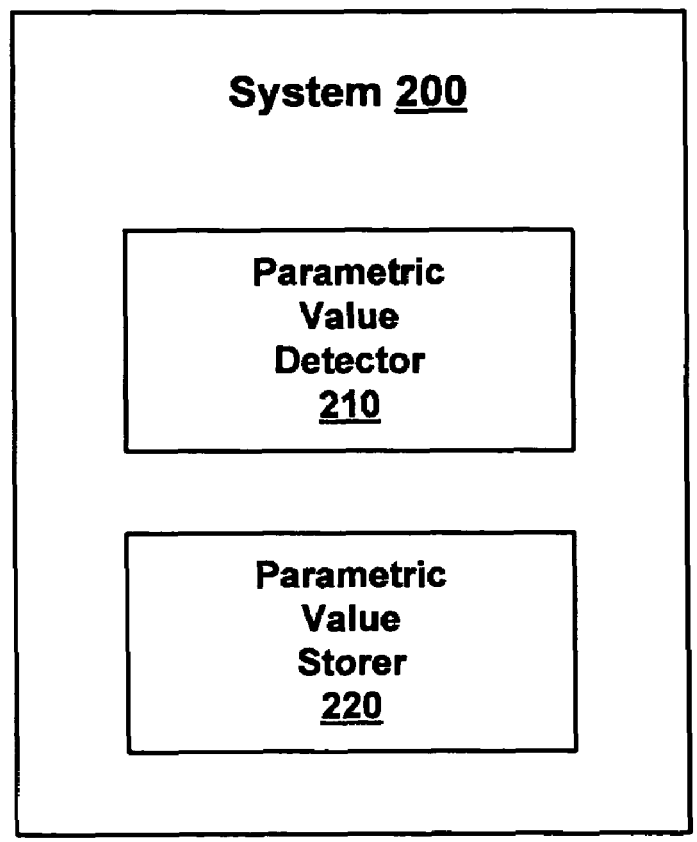
FIG. 2 depicts a system for determining the reliability of a disk drive, according to one embodiment.

FIG. 2 depicts a system for determining the reliability of a disk drive, according to one embodiment. As depicted in FIG. 2, system 200 includes a parametric value detector 210 and a parametric value storer 220. The parametric value detector 210 is used for detecting values (also known as "parametric values") for a parameter associated with a particular type of component of a disk drive, for example, while performing simulations, such as customer usage simulations on the disk drive. The parametric value storer 220 is used for storing the values, thus, enabling analysis of the values for statistical variations to determine the reliability of the disk drive.

According to one embodiment, one or more parametric value detectors 210 can be used for determining parametric values for a first sample of disk drives while performing simulations on the first sample of disk drives. One or more parametric value storers 220 can be used to store the parametric values. The parametric values from different samples can be compared to each other to determine if there are statistical variations between the different samples parametric values.

A Method of Determining the Reliability of a Disk Drive

Figure 3:
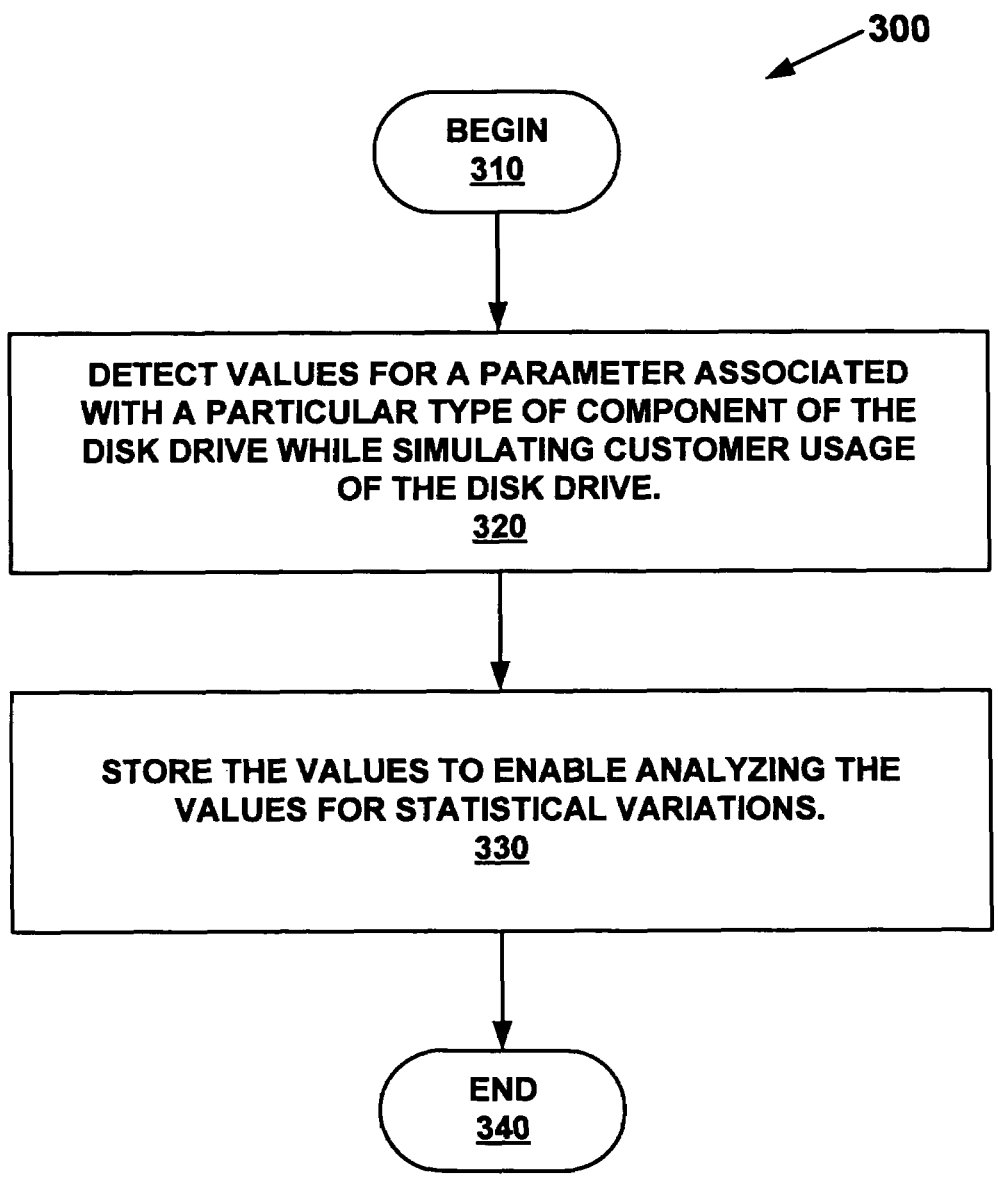
FIG. 3 depicts a flowchart describing a method of determining the reliability of a disk drive, according to one embodiment of the present invention.

FIG. 3 depicts a flowchart 300 describing a method of determining the reliability of a disk drive, according to one embodiment of the present invention. Although specific steps are disclosed in flowchart 300, such steps are exemplary. That is, embodiments of the present invention are well suited to performing various other steps or variations of the steps recited in flowchart 300. It is appreciated that the steps in flowchart 500 may be performed in an order different than presented, and that not all of the steps in flowchart 500 may be performed.

All of, or a portion of, the embodiments described by flowchart 300 can be implemented using computer-readable and computer-executable instructions which reside, for example, in computer-usable media of a computer system or like device. As described above, certain processes and steps of the present invention are realized, in one embodiment, as a series of instructions (e.g., software program) that reside within computer readable memory of a computer system and are executed by the computer system. When executed, the instructions cause the computer system to implement the functionality of the present invention as described below.

In step 310, the method begins.

In step 320, values are detected for a parameter associated with a particular type of component of the disk drive while simulating customer usage of the disk drive. For example, a disk drive may be subjected to a simulation, such as a customer usage simulation, as a part of a part of ongoing reliability test. While the simulation is being performed on the disk drive values for various parameters associated with various types of disk drive components can be detected. Assume for the sake of illustration that the amplitude is measured for the reader of a disk drive. In this case, the reader is an example of a type of component and the amplitude is an example of a parameter. The amplitude typically varies over time. The values of the amplitude can be detected, for example, using a parametric value detector 210.

In another example, a parametric value detector 210 can detect overwrite values. In this case, overwrite is an example of a parameter for components such as the writer and the disk.

In step 330, the values are stored to enable analyzing the values for statistical variations to determine the reliability of the disk drive. A parametric value storer 220 can store the values that are detected in step 340. According to one embodiment, the values are stored one at a time as they are detected. According to another embodiment, more than one value can be stored at a time. For example, values can be cached (also known as buffering) as they are detected and then the cached values can be stored. An interleaving method, which is well known in the art, can be used for filling the cache and emptying the cache as values are stored.

In step 340, the method ends.

As already stated, the reliability of more than one disk can be determined at a time. For example, ongoing reliability testing can be performed simultaneously on a sample of disk drives using various embodiments described herein. For example, values may be detected using step 320 and stored using step 330 for a sample of many disk drives. The values for one sample of disk drives can be compared to the values for another sample of disk drives to determine if there are statistical variations between the values for the different samples.

There has been a long felt need for improved ways of determining the reliability of a disk drive, for example, by analyzing parametric values collected during ongoing reliability testing according to various embodiments. Many manufacturers of disk drives have failed to improve the way that the reliability of a disk drive is determined. Further, because various embodiments provide for an improved way of determining the reliability of a disk drive which in turn can be used to improve the quality of disk drives, various embodiments will result in commercial success.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of determining the reliability of a disk drive, the method comprising:
    detecting values for a parameter associated with a particular type of component of the disk drive while simulating customer usage of the disk drive;
    storing the values to enable analyzing the values for statistical variations to determine the reliability of the disk; and
    using the analysis of the values to improve the manufacturing process used to manufacture the disk drive.

2. The method as recited by claim 1, further comprising:
    analyzing the values for statistical variations as a part of ongoing reliability testing.

3. The method as recited by claim 2, wherein the analyzing of the values for statistical variations further comprises:
    using statistical process control to analyze the values.

4. The method as recited by claim 1, wherein the detecting of the values for the parameter associated with the particular type of the component of the disk drive further comprises:
    detecting the values for the parameter associated with the particular type of the component of the disk drive, wherein the disk drive is selected from disk drives that were manufactured during a certain period of time.

5. The method as recited by claim 1, further comprising:
    visually highlighting the value if it exceeds a specified threshold.

6. The method as recited by claim 1, wherein the component is selected from a group consisting of head, motor, disk, and disk drive card.

7. A system for determining the reliability of a disk drive, the system comprising:
    a parametric detector for detecting values for a parameter associated with a particular type of component of the disk drive while simulating customer usage of the disk drive;
    a parametric value storer for storing the values to enable analyzing the values for statistical variations to determine the reliability of the disk; and
    an automatic analyzer for analyzing the values to improve the manufacturing process used to manufacture the disk drive.

8. The system of claim 7, wherein the component is selected from a group consisting of head, motor, disk, and disk drive card.

9. The system of claim 7, wherein the parameter is selected from a group consisting of overwrite, asymmetry, amplitude, resistance, write errors, soft error rate (SER), recovered error count, grown defects count, motor current, how long it takes to start the motor, repeatable and non-repeatable run out errors, write channel chip, servo automatic gain control, throughput and seek time.

10. The system of claim 7, wherein the values are analyzed as a part of ongoing reliability testing.

11. The system of claim 7, wherein the disk drive is selected from disk drives that were manufactured during a certain period of time.

12. The system of claim 7, wherein the value is visually highlighted if it exceeds a specified threshold.

13. A method of determining the reliability of disk drives, the method comprising:
    determining a particular type of component's parametric values for a first sample of disk drives while performing simulations on the first sample of disk drives;
    comparing the parametric values for the first sample of disk drives to parametric values of a second sample of disk drives to determine if there are statistical variations between the parametric values for the first sample of disk drives and for the second sample of disk; and
    using the results of the comparison to improve a manufacturing process that the first and second samples of disk drives were manufactured with.

14. The method as recited by claim 13, wherein the first sample and second samples of disk drives were manufactured during different periods of time.

15. The method as recited by claim 13, wherein the comparison of the parametric values further comprises:
    using the comparison of the parametric values to assess the risk of selling disk drives.

16. The method as recited by claim 13, wherein the component is selected from a group consisting of head, motor, disk, and disk drive card.

17. The method as recited by claim 13, wherein the parameter is selected from a group consisting of overwrite, asymmetry, amplitude, resistance, write errors, soft error rate (SER), recovered error count, grown defects count, motor current, how long it takes to start the motor, repeatable and non-repeatable run out errors, write channel chip, servo automatic gain control, throughput and seek time.

* * * * *

UNITED STATES PATENT AND TRADEMARK OFFICE
CERTIFICATE OF CORRECTION

PATENT NO.         : 7,663,828 B2
APPLICATION NO. : 11/585456
DATED                 : February 16, 2010
INVENTOR(S)       : Lin et al.

It is certified that error appears in the above-identified patent and that said Letters Patent is hereby corrected as shown below:

Col. 7, Line 21, Claim 1: Delete "disk;"
and insert -- disk drive; --

Col. 7, Line 52, Claim 7: Delete "disk;"
and insert -- disk drive; --

Col. 8, Line 30, Claim 13: Delete "disk;"
and insert -- disk drives; --

Signed and Sealed this

Twenty-first Day of September, 2010

David J. Kappos
*Director of the United States Patent and Trademark Office*